United States Patent
Spies

(10) Patent No.: US 9,773,243 B1
(45) Date of Patent: *Sep. 26, 2017

(54) SYSTEM FOR STRUCTURED ENCRYPTION OF PAYMENT CARD TRACK DATA WITH ADDITIONAL SECURITY DATA

(75) Inventor: Terence Spies, Mountain View, CA (US)

(73) Assignee: Voltage Security, Inc., Cupertino, CA (US)

( * ) Notice: Subject to any disclaimer, the term of this patent is extended or adjusted under 35 U.S.C. 154(b) by 1432 days.

This patent is subject to a terminal disclaimer.

(21) Appl. No.: 13/397,639

(22) Filed: Feb. 15, 2012

(51) Int. Cl.
*G06Q 20/38* (2012.01)

(52) U.S. Cl.
CPC .................. *G06Q 20/3823* (2013.01)

(58) Field of Classification Search
CPC .. G06K 9/00724; G06K 7/086; G06K 7/1016; G06F 12/0246; G06F 3/061; G06F 2212/1044; G06F 21/6218; G06Q 10/06311; G06Q 10/063114; G06Q 10/06316; G06Q 40/02
See application file for complete search history.

(56) References Cited

U.S. PATENT DOCUMENTS

| | | | |
|---|---|---|---|
| 5,426,286 A * | 6/1995 | Nair ....................... | G06K 7/084 235/449 |
| 7,418,098 B1 | 8/2008 | Mattsson et al. | |
| 7,738,717 B1 | 6/2010 | Palmer et al. | |
| 7,740,173 B2 * | 6/2010 | Von Mueller ........... | G06F 21/72 235/380 |
| 7,770,789 B2 | 8/2010 | Oder, II et al. | |
| 8,666,823 B2 * | 3/2014 | Spies ..................... | G06Q 20/20 705/14.53 |

(Continued)

FOREIGN PATENT DOCUMENTS

EP  1909212  4/2008

OTHER PUBLICATIONS

"Information Technology—Identification Cards—Financial Transaction Cards", ISO/IEC 7813:2006, International Jul. 1, 2006. Sixth Edition, Switzerland.

*Primary Examiner* — Mamon Obeid
*Assistant Examiner* — Johann Choo
(74) *Attorney, Agent, or Firm* — Treyz Law Group, P.C.; Michael H. Lyons

(57) ABSTRACT

A system may include a point-of-sale system that gathers payment card track data from a payment card and a payment gateway that processes the track data to authorize purchase transactions. Discretionary data in a discretionary field of the track data may be compressed to create space that may be used to accommodate additional security data. The sensitive information may be moved to the discretionary field. The compressed discretionary data and the sensitive information may be encrypted using a structure preserving encryption algorithm and a managed encryption key. The managed encryption key or other additional security data may be added the discretionary field. Track data that has been modified in this way may be conveyed to the payment gateway for processing. The payment gateway may extract the key management data, decrypt the encrypted data, and reconstruct the original track data by decompressing the discretionary data and replacing the sensitive track data.

13 Claims, 10 Drawing Sheets

(56) References Cited

U.S. PATENT DOCUMENTS

| | | | | |
|---|---|---|---|---|
| 8,775,805 | B2* | 7/2014 | von Mueller | G06Q 20/085 705/35 |
| 8,843,417 | B2* | 9/2014 | Hammad | G06Q 20/085 705/44 |
| 2006/0005013 | A1* | 1/2006 | Huitema | G06F 21/46 713/162 |
| 2006/0049256 | A1* | 3/2006 | von Mueller | G06F 21/72 235/449 |
| 2007/0262138 | A1 | 11/2007 | Somers et al. | |
| 2008/0065554 | A1* | 3/2008 | Hogan | G06Q 20/02 705/64 |
| 2010/0284532 | A1 | 11/2010 | Burnett et al. | |
| 2010/0299267 | A1* | 11/2010 | Faith | G06Q 20/10 705/76 |
| 2011/0246315 | A1* | 10/2011 | Spies | G06Q 20/20 705/16 |
| 2012/0203700 | A1* | 8/2012 | Ornce | G06Q 20/385 705/67 |

* cited by examiner

SYSTEM FOR STRUCTURED ENCRYPTION OF PAYMENT CARD TRACK DATA WITH ADDITIONAL SECURITY DATA

BACKGROUND

This relates to encryption and, more particularly, systems for encrypting card data such as payment card data.

Credit cards and other payment cards are widely used in modern financial transactions. In a typical transaction, a cardholder swipes a payment card through a magnetic stripe reader associated with a point-of-sale system. The magnetic stripe reader extracts track data from the payment card. The point-of-sale system sends the track data to a remote payment gateway to determine whether the cardholder is authorized to make a purchase. If the cardholder is authorized, the cardholder's purchase may be charged to the cardholder's account.

The track data from a payment card may include sensitive information such as the cardholder's account number. Due to the sensitive nature of the track data, the track data is often encrypted at or near the point-of-sale system. If care is not taken, however, the encryption process will significantly change the format of the track data. An encrypted version of the track data in which the format of the track data is changed may not be compatible with systems that are interposed between the point-of-sale terminal and the payment gateway. As a result, track data is often encrypted using cryptographic systems that preserve at least the size (length) of the track data and often the character space of the data.

Modern encryption systems require support for encryption key rollover in which encryption keys used to encrypt data are periodically changed. Key rollover support requires that additional information (e.g., key version numbers) be transmitted along with encrypted data so that a decryption engine is able to generate a decryption key corresponding to the correct key version. Challenges can arise in handling key version numbers, particularly in systems that attempt to preserve the format of track data.

It would therefore be desirable to be able to provide improved ways in which to secure payment card track data such as payment card track data that is encrypted using a key rollover scheme.

SUMMARY

A point-of-sale system may have a card interface that gathers payment card track data from a payment card. The payment card track data may include sensitive information such as a primary account number and a card expiration date. The payment card track data may also include a discretionary field containing discretionary data.

To ensure that sensitive information in the track data is secured, the sensitive information may be encrypted. Encryption of sensitive data may include a format-preserving or structure-preserving encryption process that uses a managed encryption key. The point-of-sale system may compress a portion of the track data including the discretionary data. Compression of the discretionary data may create extra space in the discretionary field that may be used to store encrypted sensitive data and additional data such as encryption key management data, integrity data or other additional data.

During compression and encryption operations, the point-of-sale system may, for example, remove selected personal account number digits from the personal account number. The selected personal account number digits may be moved to the discretionary field before or after compression of the discretionary data. The compressed data in the discretionary field may then be encrypted.

Optional checksum adjustment information and information representing how many digits of the primary account number have been removed from the personal account number may be inserted into the primary account number.

Track data that has been modified to incorporate compressed discretionary data, encrypted sensitive data, and additional security data such as key management data may be conveyed to a payment gateway for processing. The payment gateway may extract the key management data from the discretionary field. The payment gateway may then use the extracted key management data to obtain the encryption key that was used to encrypt the sensitive data. The payment gateway may use the encryption key to decrypt the encrypted data and reconstruct the original track data by decompressing the discretionary data and replacing the personal account number digits in the personal account number.

Further features of the invention, its nature and various advantages will be more apparent from the accompanying drawings and the following detailed description of the preferred embodiments.

DETAILED DESCRIPTION

Figure 1:
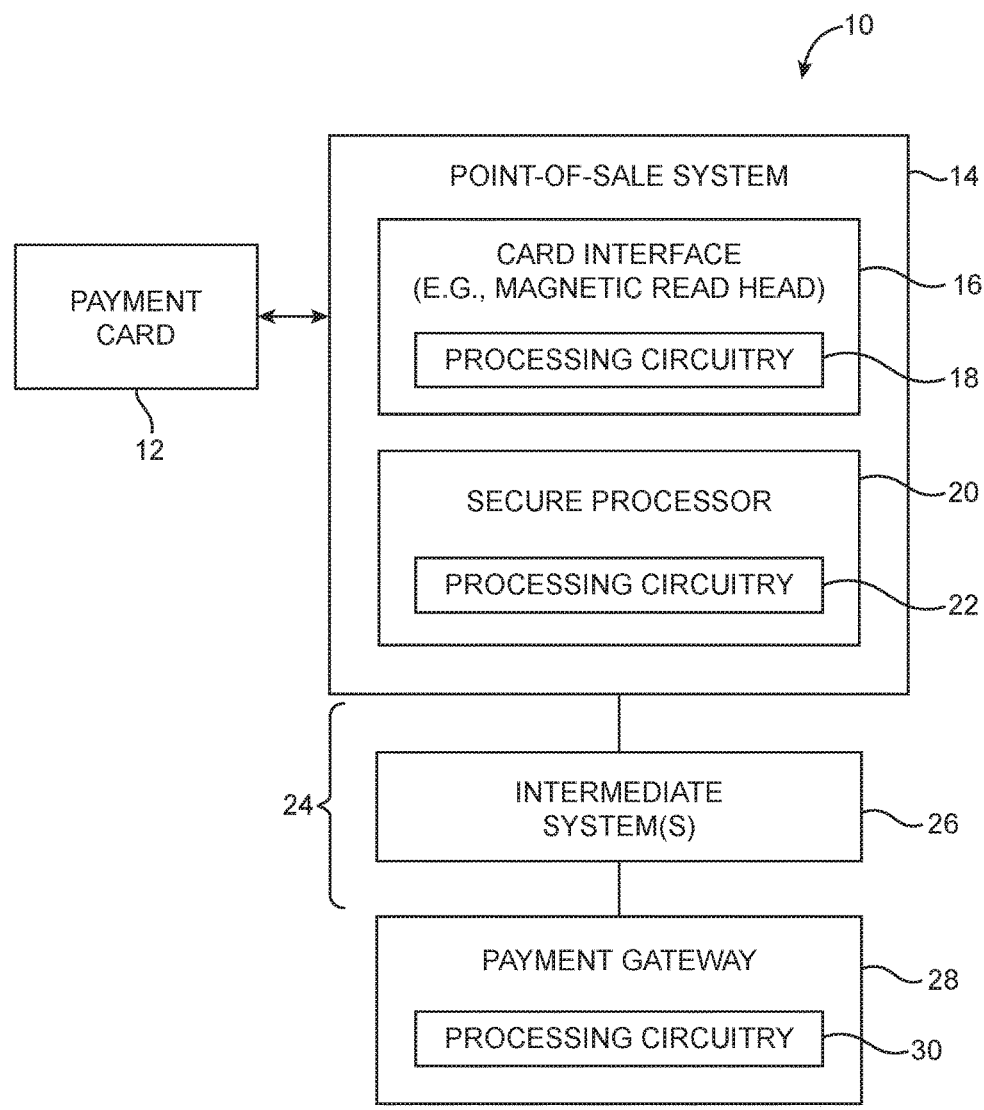
FIG. 1 is a system diagram of an illustrative system containing a point-of-sale system that receives payment card track data and a payment gateway that communicate over a communications network in accordance with an embodiment of the present invention.

In a typical payment card transaction, a user of a payment card swipes the card through a magnetic stripe reader in a point-of-sale system at a merchant. The magnetic stripe reader extracts track data from one of several magnetic stripe tracks on the card. The track data is transmitted over a network to a payment gateway or other computing equipment that handles activities associated with authorizing payment card transactions. The payment gateway, which is sometimes referred to as a host gateway, a host, a payment card gateway, or a payment card data processor, may be associated with one or more credit card companies or other financial institutions that support payment card transactions. The payment gateway generally includes a database of information used in authorizing charges for payment cards.

Some point-of-sale systems may communicate directly with payment gateways. In other situations, one or more intermediate systems may be interposed between a point-of-sale system and a payment gateway. For example, a store with multiple check-out lines may have multiple point-of-sale systems that communicate with a centralized store controller. If the store is part of a chain of stores in a large company, each store may, in turn, use its store controller to communicate with a regional controller. The regional controller may then communicate directly with the payment gateway (as an example).

System architectures such as these may provide benefits for organizations that handle numerous payment card transactions. For example, store controllers may be helpful in aggregating payment card traffic from numerous point-of-sale systems in a store. Regional controllers may be used to implement fraud detection algorithms and may be used in preferentially routing payment card transactions among various available payment gateways (e.g., to balance traffic in a heavily loaded system).

If care is not taken, encryption operations at a point-of-sale terminal that are used to secure track data may change the format of the track data significantly. For example, some portions of the track data may be required to be stored in a numeric character space. Encryption of data that is required to be stored in a numeric character space into, for example, an alphanumeric character space may render the encrypted track data incompatible with one or more intermediate systems (e.g., the encrypted track data may fail error checking processes or may be incompatible with other error checking operations). As another example, encryption operations may use an encryption key management procedure such as key rollover in which key management data such as a key version number is required to be transmitted with the track data so that a corresponding decryption key may be obtained. Insertion of additional data such as key management data into the track data may change the length of the track data. Changing the length of the track data may render the encrypted track data incompatible with one or more intermediate systems.

To ensure that sensitive data such as track data from a payment card is secured while still being able to pass through intermediate systems between a point-of-sale system and a payment gateway, processing circuitry at a point-of-sale terminal may perform compression operations and structured encryption operations on the track data. The compression operations may create extra space in portions of the track in which additional security data (e.g., encryption key management data, key rollover data, key version numbers, integrity data, checksum data, etc.) may be stored. The structured encryption operations ensure that the track data format is not altered significantly. This allows the modified track data with additional security data to pass through intermediate systems successfully. Processing circuitry at a payment gateway (sometimes referred to as a host gateway) may perform corresponding decompression and decryption operations to recover the original track data. The payment gateway may then process the track data. For example, the payment gateway may perform payment card authorization operations using the track data.

Various elements of track data on an International Organization for Standardization (ISO) 7813 formatted magnetic stripe card may be secured in this way. With one suitable arrangement, which is sometimes described herein as an example, primary account number (PAN) data within the track data is secured. If desired, other types of sensitive track data such as card expiration date data may be secured.

The primary account number is typically a 12-19 digit number. Each digit may have a value of 0-9. In the context of a credit card, the primary account number is sometimes referred to as the credit card number. Other types of cards (e.g., loyalty cards, debit cards, etc.) may also have an associated PAN. It is not always necessary or desirable to encrypt the entire PAN when securely conveying PAN data between a point-of-sale system and a payment processor. For example, it may be desirable to leave the last four digits of the PAN or the first six and the last four digits of the PAN unaltered (as examples). In scenarios such as these, it is only necessary to encrypt the leading or middle portion of the PAN.

Sensitive track data such as selected PAN digits may be secured using a track data encryption procedure that is sometimes referred to as TEP3.

The TEP3 procedure uses the point-of-sale system to shift all or part of the PAN to the discretionary data portion of the track data. Before or after shifting all or part of the PAN to the discretionary data portion of the track data, TEP3 uses the point-of-sale system to compress the discretionary data in the discretionary data portion of the track using run-length-encoding (RLE) or other compression techniques. The point-of-sale system may then encrypt the compressed discretionary data portion of the track including the PAN data that was shifted to the discretionary portion of the track using structure preserving encryption processes. The point-of-sale system may then insert additional security data (e.g., encryption key management data that was used during encryption of the compressed discretionary portion of the data, integrity data, or other data) into a known location within the compressed encrypted discretionary data. This alters the format of the track data somewhat, but enables the TEP3 track to pass various levels of format checking by intermediate systems between the track data reader and the decrypting payment gateway equipment while carrying key management data, integrity data or other additional data.

An illustrative system of the type that may secure payment card track data is shown in FIG. 1. As shown in FIG. 1, system 10 may include a point-of-sale system such as point-of-sale system 14. Point-of-sale system 14 may include card interface 16. Card interface 16 may be used to obtain track data from payment card 12. For example, card interface 16 may include magnetic read head equipment for reading track data from a magnetic stripe on payment card 12. If desired, other types of payment cards may be used in system 10. For example, card 12 may be a smart card that contains one or more integrated circuits that store track data and/or perform card functions) or may be a wireless card that uses wireless circuitry for conveying track data. Use of magnetic stripe payment cards and a card interface that is based on a magnetic stripe reader may sometimes be described herein as an example. In general, payment card 12 may be any card or electronic equipment that contains payment data to be secured.

To enhance security, it may be desirable to embed processing circuitry 18 within card interface 16. For example, an integrated circuit processor may be embedded within a magnetic read head using a tamper-proof enclosure. This may help prevent an attacker from gaining access to unencrypted magnetic strip track data from card 12. An ancillary processor such as secure processor 20 may be provided within point-of-sale system 14 to allow point-of-sale system to perform processing tasks that might otherwise burden processing circuitry 18. Processing circuitry 18 in point-of-sale system 14 and processing circuitry 22 in secure processor 20 may communicate securely using a shared cryptographic key.

If desired, other architectures may be used for point-of-sale system 14. For example, arrangements that use only one processor may be used. The example of FIG. 1 is merely illustrative.

After obtaining track data from card 12 and securing at least some of the track data and inserting additional security data, point-of-sale system 14 may use processing circuitry such as processing circuitry 22 to transmit the secured track data with the additional security data to payment (host) gateway 28. The transmitted track data may pass through communications network 24. Communications network 24 may include local area network links, wide area network links, one or more intermediate systems 26 such as a store controller, a regional controller, etc. Intermediate systems 26 may not function properly if the format of the track data received from point-of-sale system 14 has been excessively modified. Point-of-sale system 14 therefore preferably uses a compression and structured encryption technique in securing the track data and inserting the additional security data. The compression and structured encryption technique secures sensitive portions of the track data and allows concurrent transmission of additional security data without changing the format of the track data excessively. This allows the modified track data including the additional security data to pass through intermediate systems 24 to payment gateway 28. At payment gateway 28, the track data may be processed using processing circuitry 30. For example, processing circuitry 30 may decompress and decrypt encrypted track data and may perform operations for authorizing a purchase transaction with payment card 12.

Figure 2:
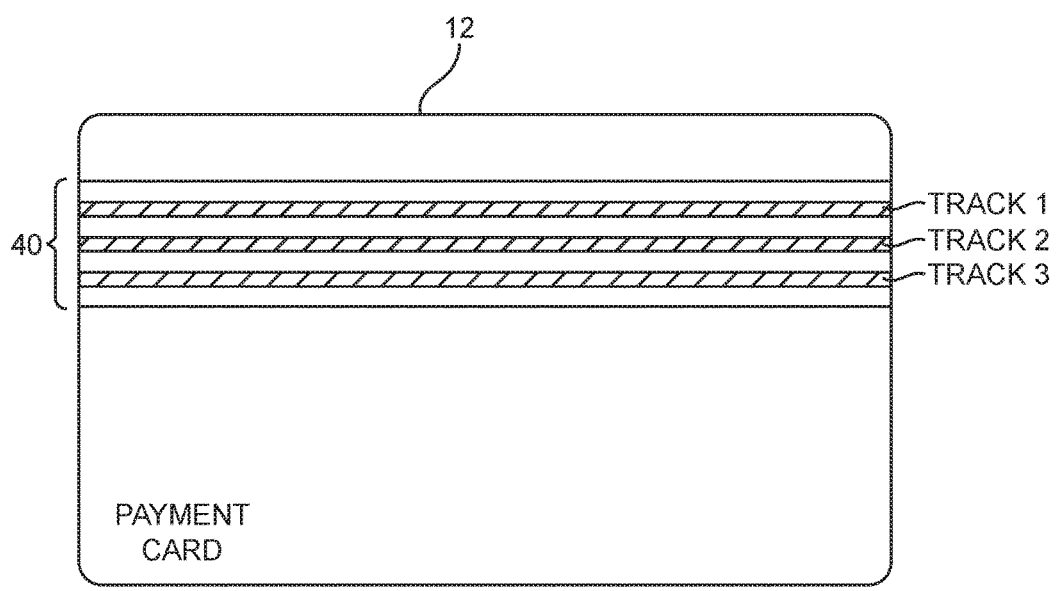
FIG. 2 is a diagram showing how track data containing additional data may be arranged on a payment card in accordance with an embodiment of the present invention.

The International Organization for Standardization (ISO) 7813 specification details how card information (track data) is encoded on the magnetic stripe of a payment card. The specification sets for the acceptable format for three parallel tracks on the card, designated as Track 1, Track 2, and Track 3. Each track contains a set of characters arranged as a fixed length string. As shown in FIG. 2, payment card 12 may have Track 1, Track 2, and (if desired) Track 3 arranged on a magnetic stripe such as magnetic stripe 40 such that Track 1, Track 2, and Track 3 run lengthwise along payment card 12. Track 1 is formed nearest to the top of payment card 12, Track 3 is formed nearest the bottom of payment card 12, and Track 2 is formed between Track 1 and Track 3.

Track 2 is typically a low density track (i.e., Track 2 contains a lower number of bits per inch than Track 1 and Track 3). Track 3 is typically the highest density track and may contain up to 250 alphanumeric characters. Track 3 is not commonly used during payment card transactions. Track 2 is typically the default track read by point-of-sale systems such as point-of-sale system 14 of FIG. 1 and contains numeric characters. Track 2 and Track 3 contain alphanumeric characters. Track data contained in Track 1, Track 2, and/or Track 3 of payment card 12 may be compressed and encrypted to protect sensitive information. Compression and encryption of Track 1 and Track 2 are discussed herein as examples.

Track 1 contains the following set of characters:
STX: Start sentinel "%"
FC: Format code "B"
PAN: Primary Account Number, up to 19 digits
FS: Separator "^"
NM: Name, 2 to 26 characters
FS: Separator "^"
ED: Expiration data, 4 digits or "^"
SC: Service code, 3 digits or "^"
DD: Discretionary data, balance of characters
ETX: End sentinel "?"
LRC: Longitudinal redundancy check Track 1 is a maximum of 79 characters long. As an example, Track 1 for a payment card 12 (FIG. 1) associated with a user named Michael Jones and having a PAN 1111112222223333 may be:
% B1111112222223333^MICHAEL JONES^0000^835^00000000000000000000000000000037-80000?9

As shown in this illustrative track data, Track 1 may include a start character ("%") STX and a corresponding end character ("?") ETX followed by a checksum LRC for the entire track (9 in the current example). The second character FC in the track data ("B") specifies that the track is using the payment industry format (as opposed to other formats such as loyalty card formats). The digits following the "B" character make up the PAN (i.e., the PAN is "1111112222223333"). The "^" symbols are separators FS. The cardholder name NM in this example is "MICHAEL JONES". The expiration date ED (immediately following the cardholder name) is "0000". The digits "835" represent a service code SC. Service code SC, which is private to the card issuer, may be used to represent information such as which discounts are associated with the card, etc. The discretionary field of the track data in this example contains the string between the last separator and the end character (i.e., the discretionary data is "00000000000000000000000000003780000").

Track 2 contains the following set of characters:
STX: Start sentinel ";"
PAN: Primary Account Number, up to 19 digits
FS: Separator "="
ED: Expiration date, YYMM or "=" if not present
SC: Service code, 3 digits or "=" if not present
DD: Discretionary data, balance of available digits
ETX: End sentinel "?"
LRC: Longitudinal redundancy check Track 2 is a maximum of 40 characters long. Therefore, using the previous example of a card user Michael Jones having a PAN 1111112222223333, Track 2 may be:
;61111112222223333=0000=835=000000000378?9

As shown in this illustrative track data, Track 2 may include a start character (";") STX and a corresponding end character ("?") ETX followed by a checksum LRC for the entire track (9 in the current example). The second character FC in the track data ("B") specifies that the track is using the payment industry format (as opposed to other formats such as loyalty card formats). The digits following the "B" character make up the PAN (i.e., the PAN is "1111112222223333"). The "=" symbols are separators FS. The cardholder name NM is "MICHAEL JONES". The expiration date ED (immediately following the cardholder name) is "0000". The digits "835" represent, as in Track 1, a service code SC. The discretionary field of the track data in this example contains the string between the last separator and the end character (i.e., the discretionary data is "000000000378").

To ensure that sensitive information such as PAN information is secured, all or part of the sensitive portions of the track data can be encrypted. For example, some or all of the PAN, expiration data field, discretionary data field or other portions of the track data may be encrypted. Illustrative arrangements in which a portion of a PAN is shifted to the discretionary data field and then the discretionary data is encrypted are sometimes described as an example. In this example, additional security data is inserted into a known location in the discretionary data field using extra space generated by compressing the discretionary data prior to shifting the portion of the PAN. This is merely illustrative. An entire PAN and/or portions of other sensitive data within the track data may be encrypted if desired.

Techniques for compressing and encrypting portions of the track data and inserting additional security data may be implemented at point-of-sale system 14 using processing circuitry such as processing circuitry 22. Corresponding decompression and decryption techniques may be used to perform decompression and decryption of track data at payment gateway 28 using processing circuitry 30 (e.g., using the additional security data that is transmitted along with the compressed encrypted track data and a shared key that is shared between the point-of-sale processing circuitry and the payment gateway processing circuitry).

Figure 3:
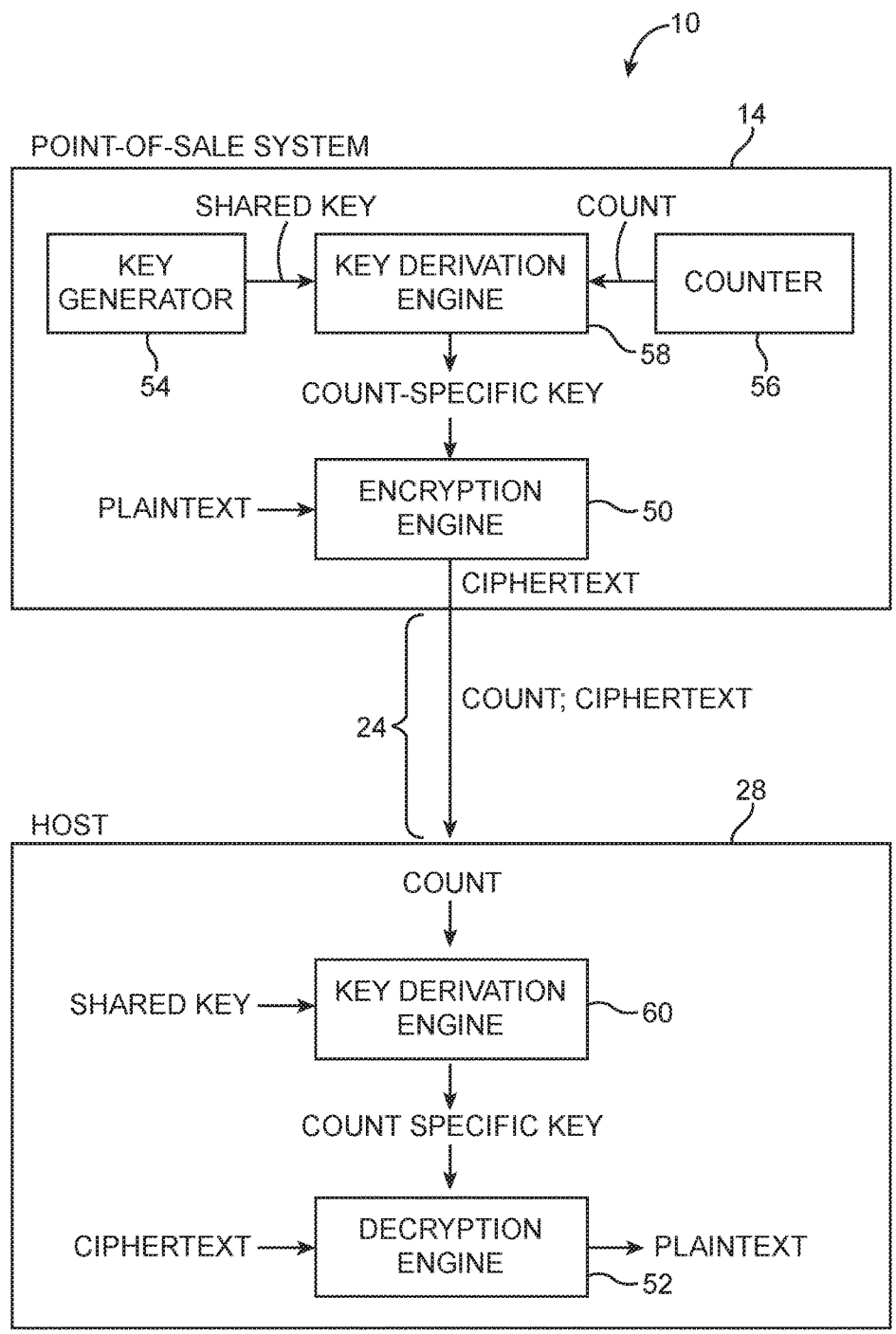
FIG. 3 is a diagram of an illustrative system in which a point-of-sale system with a structure preserving encryption process is used to include key management data in compressed payment card track data in accordance with an embodiment of the present invention.

An illustrative diagram of an encryption process that uses managed encryption keys is shown in FIG. 3. In the example of FIG. 3, compression and encryption processes may be implemented at point-of-sale system 14. Decompression and decryption processes may be implemented at host (payment gateway) 28. Compression and encryption processes implemented at point-of-sale system 14 may be implemented using processing circuitry 18 of card interface 22 or using processing circuitry 22 on a secure processor such as secure processor 20 of FIG. 1. Decompression and decryption processes implemented at host system 28 may be implemented using processing circuitry 30 of host 28.

As shown in FIG. 3, encryption using managed keys may include a key rollover system in which the encryption key used to encrypt plaintext strings with an encryption engine such as encryption engine 50 is occasionally changed. In order for a decryption engine such as decryption engine 52 to successfully decrypt data encrypted with a changing encryption key, decryption engine 52 must be provided with the encryption key that was used at the time of encryption. For this reason, key management data such as a key version number must be transmitted along with an encrypted CIPHERTEXT. In the example of FIG. 3, the key version number COUNT is transmitted along with and encrypted CIPHERTEXT over communications network 24 from point-of-sale system 14 to host 28.

As shown in FIG. 3, encryption of sensitive data PLAINTEXT using key rollover is implemented by generating a SHARED KEY using key generator 54. PLAINTEXT may include, as an example, compressed discretionary data and a portion the PAN of payment card track data. The SHARED KEY may be a symmetric key that is shared by point-of-sale system 14 and host 28 (i.e., processing circuitry 30 may use the same cryptographic algorithm and the same key that was used in encrypting the PLAINTEXT in decrypting the encrypted track data). Point-of-sale system 14 may use counter 56 to generate key management data such as a key version number COUNT to be delivered to key derivation engine 58. Key derivation engine 58 may use the SHARED KEY and the COUNT to determine a COUNT-SPECIFIC KEY that depends on the value of COUNT. In order to support key rollover, the value of COUNT generated by counter 56 may change from time to time. The COUNT-SPECIFIC KEY that depends on the value of COUNT may be delivered to encryption engine 50 along with an unencrypted string PLAINTEXT for encryption of PLAINTEXT into an encrypted CIPHERTEXT.

Encryption engine 50 may be configured to implement a format-preserving-encryption (FPE) process. An example of a cryptographic algorithm that may be used to implement an FPE process is the FFX mode of AES (Advanced Encryption Standard). This is merely illustrative. Any suitable FPE or structure-preserving-encryption (SPE) algorithms may be used in encrypting and decrypting sensitive information associated with purchase transactions if desired. The use of an FPE encryption algorithm may allow the structure of the encrypted data to be preserved (versus traditional encryption approaches which render the encrypted data into a binary field). For example, the SPE algorithm may be used to encrypt PLAINTEXT including N alphanumeric characters into N different alphanumeric characters, thereby preserving the structure of the data.

Following transmission of encrypted data CIPHERTEXT and key version number COUNT from point-of-sale system 14 to host 28, host 28 may use the SHARED KEY and the transmitted COUNT as inputs to key derivation engine 60. Key derivation engine 60 may use the SHARED KEY and COUNT to obtain (e.g., generate using a key derivation function or look up in a stored key table) the decryption key COUNT-SPECIFIC KEY that was used in encrypting CIPHERTEXT. CIPHERTEXT and COUNT-SPECIFIC KEY may then be input into decryption engine 52 to recover PLAINTEXT.

Figure 4:
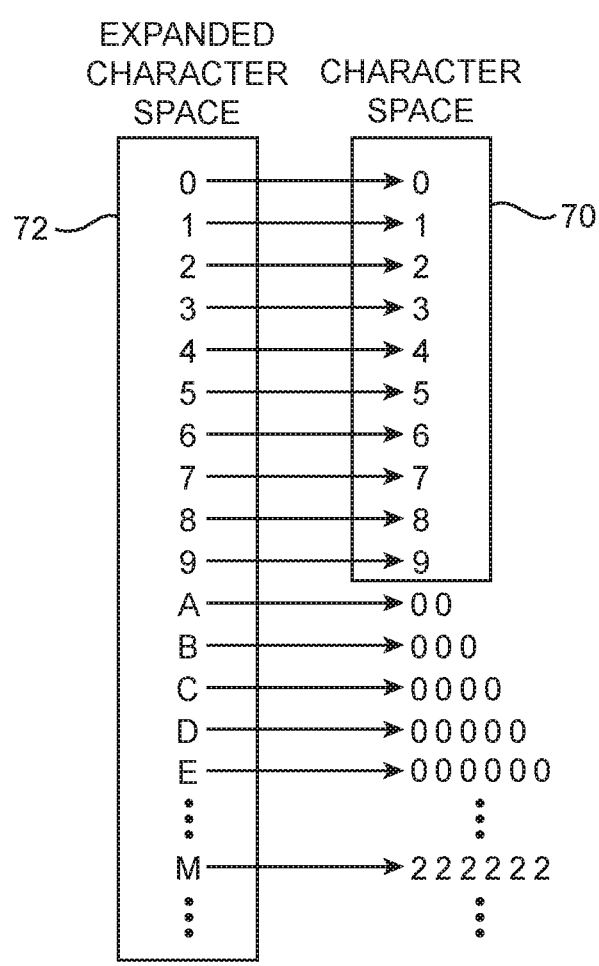
FIG. 4 is a diagram of an illustrative mapping of a character space into a larger character space that may be used during compression of payment card track data in accordance with an embodiment of the present invention.

If desired, encryption engine 50 and decryption engine 52 may be configured to additionally perform compression and decompression operations respectively. An example of a compression algorithm that may be used in compressing discretionary data of Track 1 or Track 2 is shown in FIG. 4. As shown in FIG. 4, a character space such as character space 70 may include the numeric digits 0-9. Character space 70 may be mapped into an expanded character space such as expanded character space 72 that contains alphanumeric characters including numeric character 0-9 and alphabetic characters A-Z.

Characters A-Z may, for example, be mapped to strings of zeros. However, this is merely illustrative. Characters A-Z may be mapped to any combination of numeric characters 0-9. Mapping character space 70 to an expanded character space such as expanded character space 72 may map a string of characters into a shorter string of characters thereby creating space into which additional data may be inserted. Discretionary data in a discretionary field of payment card track data such as data in Track 1 or Track 2 of payment card 12 (FIG. 2) may be compressed using, for example, an expanded character space of the type shown in FIG. 4. Payment card track data may be compressed using RLE or other compression methods. Compression of payment card track data may include a compression method of the type shown in FIG. 4 or any other method combined with a preprocessing transformation of the data such as a Burrows-Wheeler transformation.

Figure 5A:
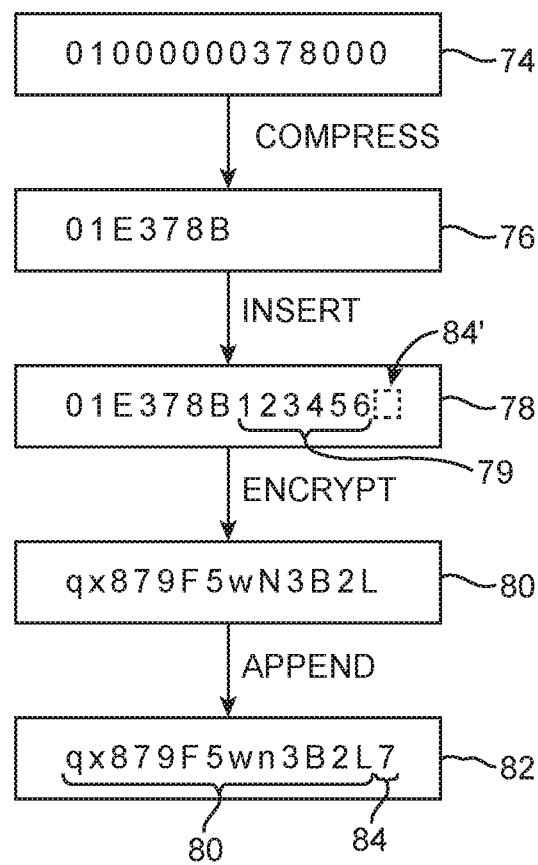
FIG. 5A is a diagram showing how a string of track data may be compressed to create additional space for appending and encrypting data in accordance with an embodiment of the present invention.

An illustrative process in which additional data may be inserted into extra space created by compressing a string is shown in FIG. 5A. As shown in FIG. 5A, plaintext 74 may include a string of numerals in the range 0-9. Plaintext 74 may represent a portion such as a discretionary portion of the track data associated with a payment card such as payment card 12 (FIG. 1). Plaintext 74 may be mapped into an expanded character space of the type shown in FIG. 4. By mapping plaintext string 74 into, for example, expanded character space 72, plaintext string 74 may be compressed into compressed plaintext string 76. Compressed plaintext string 76 may have a length that is shorter than the length of plaintext string 74, thereby shrinking the length of plaintext string 74.

In the example of FIG. 5A, plaintext string 74 contains fourteen numeric characters and compressed plaintext string 76 contains seven alphanumeric characters. In this example, seven extra spaces are generated when compressing plaintext 74 into compressed plaintext 76. This is merely illustrative. In practice, plaintext string 74 may contain any number of characters, compressed plaintext string 76 may contain any number of characters that is less than the number of characters in plaintext string 74 and compressed plaintext string 76 may be formed by compressing plaintext string 74 using any suitable compression procedure. Plaintext string 74 may be compressed using run-length-encoding (RLE), encoding of the discretionary data into an expanded character space, other compression systems or combinations of one or more compression systems. Compression of the plaintext string 74 may include data transformations such a Burrows-Wheeler transformation or other transformation.

As shown in FIG. 5A, sensitive data (e.g., a portion of a PAN, a complete PAN, an expiration date, a service code or other sensitive data) may be added to (e.g., appended, prepended, inserted within) compressed plaintext 76 to form an expanded plaintext string such as expanded plaintext string 78. Expanded plaintext string 78 contains sensitive data 79 including the string "123456." This is merely illustrative. Any sensitive data may be inserted into the extra space generated when compressing plaintext 74. Sensitive data 79 may be appended to the end of compressed plaintext 76, may be pre-pended to the beginning of plaintext 76, or may be inserted at any known location within compressed plaintext 76. Sensitive data 79 may fill a portion of the space created when plaintext string 76 was compressed to form compressed plaintext string 78. In the example of FIG. 5A, six digits are appended into the seven available spaces. This is merely illustrative. Sensitive data 79 may fill any portion of the space created when plaintext string 76 was compressed to form compressed plaintext string 78.

In order to protect sensitive data such as sensitive data 79 and compressed plaintext string 76, following insertion of sensitive data 79 to compressed plaintext 76, expanded plaintext 78 may be encrypted. As shown in FIG. 5A, expanded plaintext 78 may be encrypted using a structure preserving encryption process that maps an alphanumeric string containing N characters such as expanded plaintext string 78 to another alphanumeric string containing N characters such as encrypted string 80. In the example of FIG. 5A, both compressed plaintext string 76 and sensitive data 79 are encrypted. If desired, only sensitive data 79 may be encrypted, a portion of sensitive data 79 may be encrypted, a portion of sensitive data 79 and a portion of compressed plaintext 76 may be encrypted or any other combination of characters in expanded plaintext string 78 may be encrypted.

If desired, additional data such as additional data 84 may be added to encrypted string 80 to form appended string 82. In the example of FIG. 5A, additional data 84 includes a single digit ("7"). This is merely illustrative. The compression procedure described herein in connection with FIG. 5A may be chosen such that enough space is generated to accommodate one or more additional data strings of any chosen length. Additional data 84 may include a Message Authentication Code (MAC) that is computed from the encrypted data (or computed from a mixture of the encrypted data and some of the unencrypted elements of the track). Additional data 84 may include message integrity data such as a set of known characters (e.g., a run of zeros or other fixed string). The integrity of encrypted string 80 may be determined by host 28 by checking for the presence of these characters in the transmitted track data. Other additional data generated in an authenticated encryption can also be included.

In order to provide support for managed encryption keys (e.g., key rollover) additional data 84 may include key management data. Key management data may (as an example) be a Derived Unique Key Per Transaction (DUKPT) key serial number, or other data that indicates the key used to encrypt encrypted string 80. Additional data 84 may include (if desired) integrity data such as a checksum or fixed digits that may be recomputed and/or verified during decryption and decompression operations. Additional data 84 must be short enough that the resultant track (string) is not longer than allowed in, for example, the ISO specification. If desired, a portion of additional data 84 such as integrity data (e.g., check digits such as a checksum or one or more fixed digits) may be added (e.g., appended) to compressed string 76 prior to encryption as indicated by dashed box 84'. In this way, portion 84' of additional data 84 may be encrypted and included in encrypted string 80.

Figure 5B:
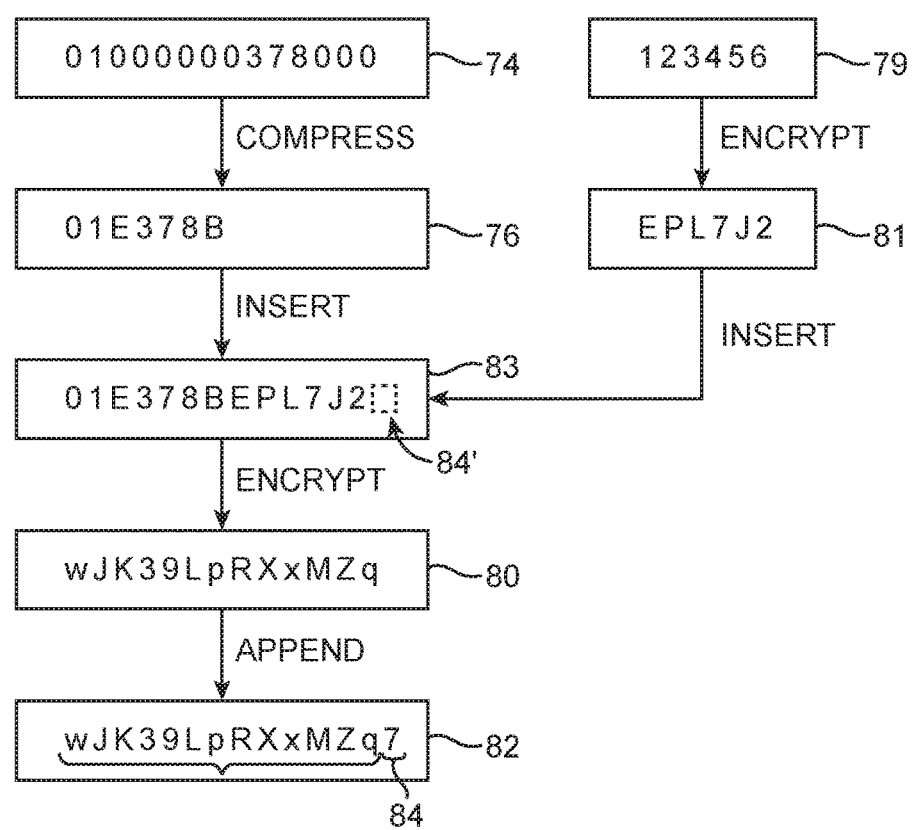
FIG. 5B is a diagram showing how sensitive data may be encrypted prior to appending data into additional space created by compressing a string of track data in accordance with an embodiment of the present invention.

The example of FIG. 5A in which plaintext sensitive data 79 is added to compressed string 76 is merely illustrative. As shown in FIG. 5B, if desired, sensitive data 79 (e.g., a portion of a PAN) may be encrypted to form encrypted sensitive data 81 prior to insertion into compressed string 76. Encrypted sensitive data 81 may then be inserted into compressed string 76 to form expanded string 83 that contains compressed string 76 and encrypted sensitive data 81.

Expanded string 83 that contains compressed string 76 and encrypted sensitive data 81 may then be encrypted to form encrypted string 80. In this way, two encryption steps may be used so that a portion of encrypted string 80 may be fully decrypted (e.g., a portion of encrypted string 80 such as compressed discretionary data in a discretionary field of payment card track data may be revealed) while encrypted sensitive data 81 (e.g., a portion of a PAN) remains encrypted.

Expanded string 80 may be encrypted as a whole (e.g., by encrypting the encrypted sensitive data together with the compressed string 76) or the compressed plaintext portion of expanded string 83 may be encrypted separately and included in encrypted string 80 together with encrypted sensitive data 81. If desired, a portion 84' of additional data 84 may be added (e.g., appended) to expanded string 83 prior to encryption of expanded string 83 to form encrypted string 80.

Figure 6:
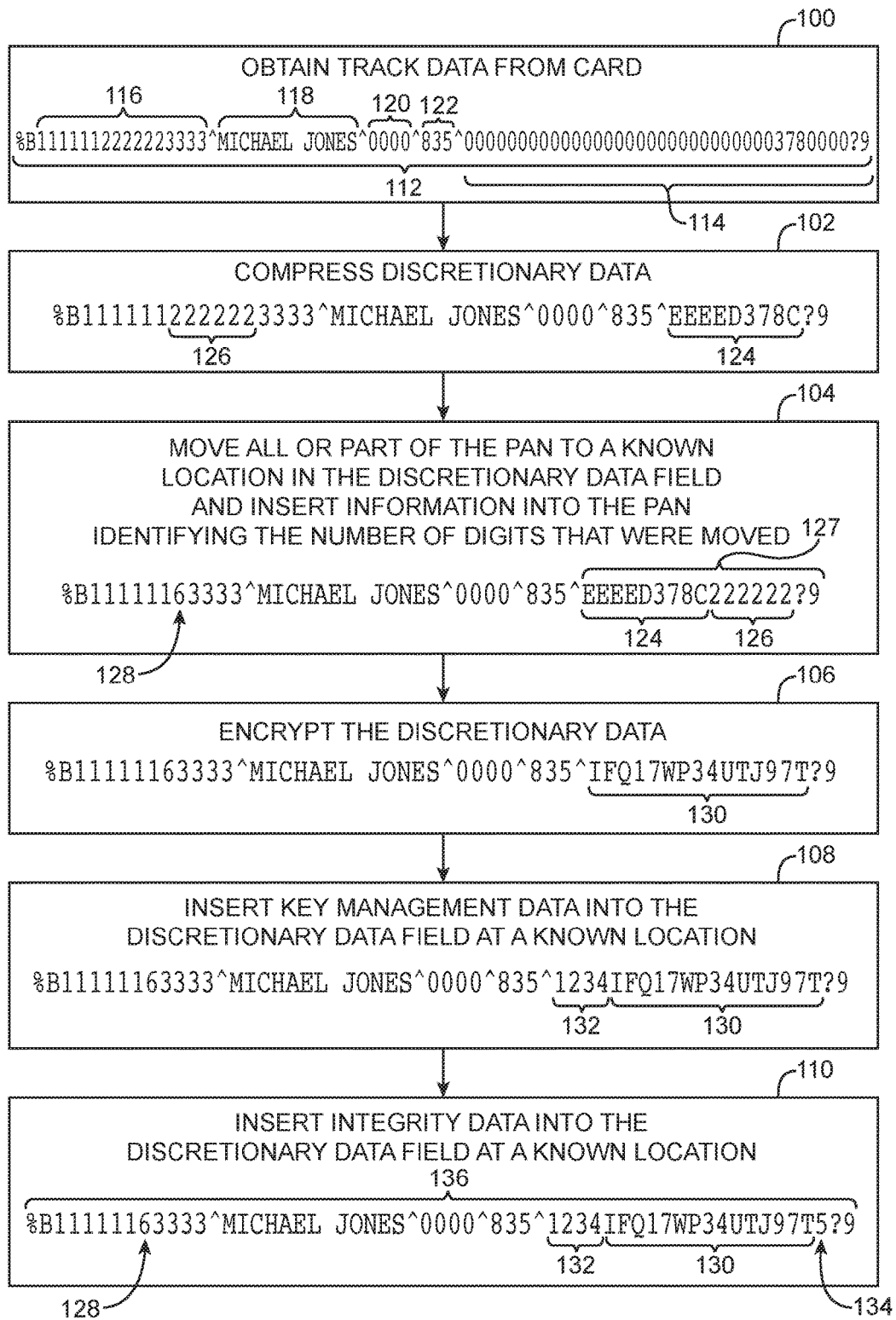
FIG. 6 is a flow chart of illustrative steps involved in compressing and encrypting track data in accordance with an embodiment of the present invention.

Illustrative steps involved in using system 10 of FIG. 1 to securely convey payment card track data between systems such as point-of-sale system 14 and payment gateway 28 are shown in FIG. 6.

At step 100, a merchant obtains the track data associated with payment card 12. For example, card interface 16 (e.g., a magnetic card reader or other equipment at the merchant) may be used to read track data 112 from payment card 12. As shown in FIG. 6, track data 112 includes PAN 116, customer name 118, expiration date data 120, service code data 122 and discretionary data 114.

At step 102, processing circuitry such as processing circuitry 18 or processing circuitry 22 of point-of-sale system 14 may be used to compress discretionary data 114 to form compressed discretionary data 124. Discretionary data 114 may be compressed using run-length-encoding (RLE), encoding of discretionary data 114 into an expanded character space, other compression systems or combinations of one or more compression systems. Compression of discretionary data 114 may include data transformations such a Burrows-Wheeler transformation or other transformation prior to compression. Discretionary data 114 may be compressed such that compressed discretionary data 124 is shorter than discretionary data 114 thereby leaving extra space in the discretionary portion of track data 112 for placement of additional data.

At step 104, a portion of the sensitive data in the track such as such as portion 126 of PAN 116 may be moved to the discretionary portion of the track to form modified discretionary data 127. As shown in FIG. 6, modified discretionary data 127 contains compressed discretionary data 124 and portion 126 of PAN 116. Portion 126 of PAN 116 may be appended to the end of compressed discretionary data 124, pre-pended to the beginning of compressed discretionary data 124, or inserted into any known location within compressed discretionary data 124. If desired, portion 126 of PAN 116 may be encrypted prior to insertion into the discretionary data field to form modified discretionary data 127. At step 104, information may be inserted into the track to indicate how many PAN digits were removed. For example, PAN removal information 128 (e.g., the number "6") may be inserted into the central portion of the PAN digits in the location from which portion 26 (e.g., the six PAN digits "222222") was removed, thereby indicating that six PAN digits were removed.

If desired, at step 104, an optional check digit such as a checksum adjustment digit (not shown) may be inserted into the track data. A checksum such as the Luhn checksum is a checksum value that typically occupies the last digit in a valid PAN and is used for error checking the PAN. The checksum adjustment digit that is inserted may be computed to have the value necessary to ensure that the checksum of the modified PAN will be valid. Following modification of the PAN, the checksum that is computed for the PAN may not match the checksum represented by the last digit of the PAN. In the presence of the inserted checksum adjustment digit, however, the computed checksum of the PAN will match the checksum represented by the last digit, allowing the modified track to pass through intermediate systems that perform this type of checking.

Another possible use of the checksum adjustment digit is to serve as a flag that indicates that the track data has been encrypted (i.e., a flag that indicates that the track data contains encrypted PAN information). With this type of approach, the checksum adjustment digit may be an offset checksum value that is offset by a known amount from the value needed to produce a valid checksum. If, for example, a digit of value "4" would ensure that the PAN would have a valid checksum, the checksum adjustment digit that is inserted into the PAN at step 104 may be "5" (i.e., the value of 4 plus a known offset value of 1). When received by the payment gateway or other systems, the payment gateway (or other system) may recognize the presence of the known offset and may therefore conclude that the track data has been processed (e.g., compressed, encrypted, etc.).

If desired, the checksum adjustment digit may be omitted. If the checksum adjustment digit is omitted, the checksum of the modified PAN will not always be valid. Some intermediate systems may not check the checksum value, so omission of the checksum adjustment value may be acceptable. Intermediate systems may also be alerted as to whether or not part of the PAN has been encrypted by the characteristics of the track data, allowing appropriately configured intermediate systems to take appropriate action (e.g., by skipping checksum checking operations, etc.). In arrangements in which the checksum adjustment digit produces an invalid checksum at a known offset from the valid checksum, the presence of the invalid checksum having the known offset from a valid checksum can indicate the presence of encryption. In arrangements in which the length of the PAN has been shortened, systems can also detect that the PAN length deviates from an expected nominal length or is less than the minimum expected length (e.g., a system may detect that the PAN has been shortened to less than 12 digits and can therefore conclude that the track data has been encrypted).

At step 106, following use of one of these three approaches (1. no checksum adjustment digit, 2. inclusion of a checksum adjustment digit that produces a valid checksum, or 3. inclusion of a checksum adjustment digit that produces an invalid checksum equal to a valid checksum offset by predetermined amount), compressed discretionary data 124 and portion 126 of PAN 116 may be encrypted. As shown in FIG. 6, portion 126 and compressed discretionary data 124 may be encrypted using an FPE algorithm that preserves the length and character space of portion 126 of PAN 116 and compressed discretionary data 124.

Encrypted discretionary data 130 includes encrypted modified discretionary data 127 (e.g., portion 126 and compressed discretionary data 124) and has the same length (e.g., 15 characters) and character space (e.g., numbers 0-9 and capital letters A-Z) as portion 126 and encrypted compressed discretionary data 124. Due to compression of discretionary data 114 prior to encryption, encrypted discretionary data 130 is shorter in length than original discretionary data 114. Therefore space is available in the discretionary portion of the track for additional data such as key management data.

At step 108, additional data 132 may be added to the discretionary portion of the track. Additional data 132 may be key management data such as a DUKPT key or other key version data associated with an encryption key that was used to encrypt portion 126 and compressed discretionary data 124 in step 104. In the example of FIG. 6, additional data 132 (e.g., the digits "1234") are pre-pended to the beginning of the discretionary portion of the track. This is merely illustrative. Additional data 132 may be appended to the end of the discretionary portion of the track, or may be inserted into any know location within encrypted discretionary data 130.

At step 110, integrity data such as integrity data 134 may be inserted into the discretionary portion of the track (e.g., appended, pre-pended or inserted into a known location). Integrity data 134 may, as shown in FIG. 6, be a single digit (e.g., the digit "5") or may be more than one digit. Integrity data 134 may include a Message Authentication Code (MAC), a set of known characters (e.g., a run of zeros or other fixed string), or other integrity data. TEP3 track data 136 including PAN removal data 128, key management data 132, integrity data 134, and encrypted discretionary data 130 may then be transmitted to payment gateway 28 through intermediate systems 26. If desired, integrity data 134 may be added to the discretionary portion of the track containing portion 126 of PAN 116 and compressed discretionary data 124 prior to encryption. In this way, integrity data 134 may also be encrypted.

Figure 7:
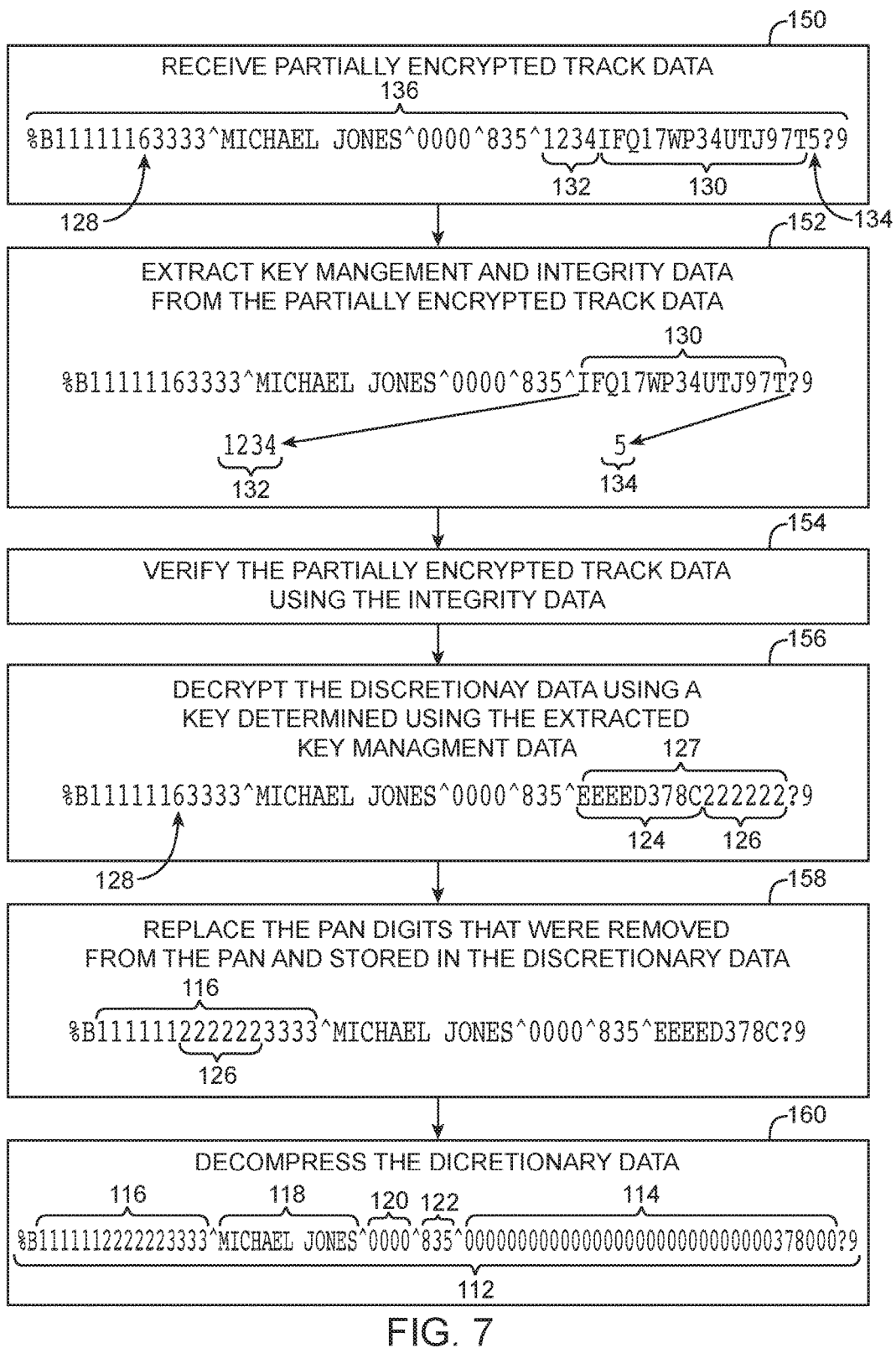
FIG. 7 is a flow chart of illustrative steps involved in decompressing and decrypting track data in accordance with an embodiment of the present invention.

Illustrative steps involved in using payment gateway 28 of FIG. 1 to process TEP3 track data generated using the steps shown in FIG. 6 are shown in FIG. 7.

At step 150, TEP3 track data 136 including PAN removal data 128, key management data 132, integrity data 134, and encrypted discretionary data 130 and other track data may be received by payment gateway 28 (see FIG. 1).

At step 152, key management data 132 and integrity data 134 may be extracted from the discretionary portion of the track.

At step 154, integrity data 134 may be used to verify the TEP3 track data.

At step 156, key management data 132 may be used to determine a managed encryption key (e.g., a count-specific key of the type shown in FIG. 3). The managed encryption key may then be used to decrypt encrypted discretionary data 130 thereby recovering compressed discretionary data 124 and portion 126 of PAN 116.

At step 158, portion 126 of PAN 116 may be replaced in the appropriate location in the PAN portion of the track and PAN removal information 128 may be removed from the PAN portion of the track.

At step 160, compressed discretionary data 124 may be decompressed to recover the original track data 112. Original track data 112 including PAN 116, customer name 118, expiration date data 120, service code data 122 and discretionary data 114 may then be used to process a payment request using payment gateway 28.

Figure 8:
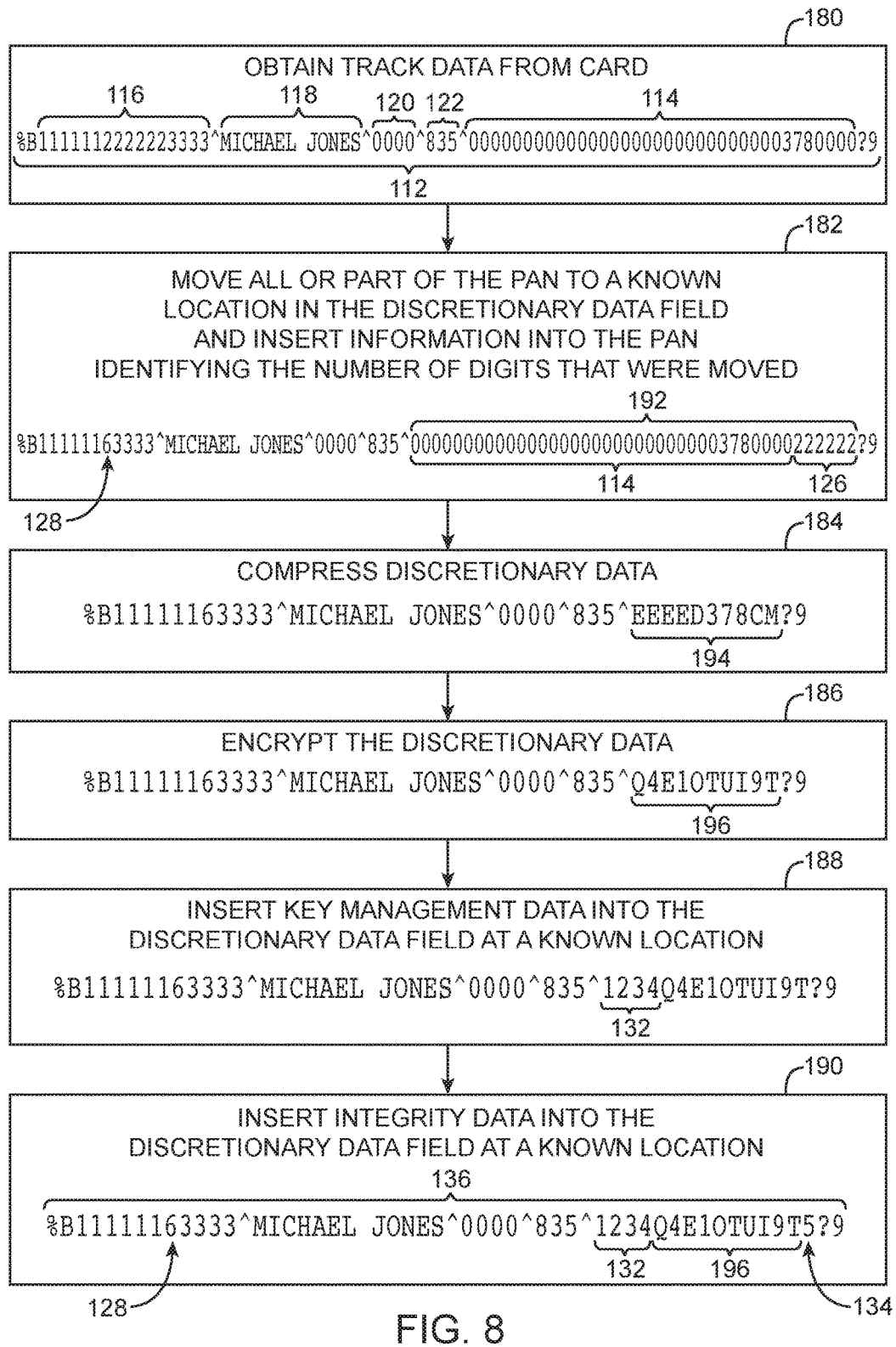
FIG. 8 is a flow chart of illustrative steps involved in compressing and encrypting track data in accordance with an embodiment of the present invention.

Illustrative steps that may be involved in an alternative method of using system 10 of FIG. 1 to securely convey payment card track data between systems such as point-of-sale system 14 and payment gateway 28 are shown in FIG. 8.

At step 180, a merchant obtains the track data associated with payment card 12 of the customer. For example, card interface 16 (e.g., a magnetic card reader or other equipment at the merchant) may be used to read track data 112 from payment card 12. As shown in FIG. 8, track data 112 includes PAN 116, customer name 118, expiration date data 120, service code data 122 and discretionary data 114.

At step 182, a portion of the sensitive data in the track such as such as portion 126 of PAN 116 may be moved to the discretionary portion of the track. Portion 126 of PAN 116 may be appended to the end of discretionary data 114, pre-pended to the beginning of discretionary data 114, or inserted into any known location within discretionary data 114. At step 182, information may be inserted into the track to indicate how many PAN digits were removed. For example, PAN removal information 128 (e.g., the number "6") may be inserted into the central portion of the PAN digits in the location from which portion 26 (e.g., the six PAN digits "222222") was removed, thereby indicating that six PAN digits were removed.

At step 184, processing circuitry such as processing circuitry 18 or processing circuitry 22 of point-of-sale system 14 may be used to compress modified discretionary data 192 including discretionary data 114 and portion 126 of PAN 116 to form compressed discretionary data 194. Compressed discretionary data 194 may be compressed using a suitable compression procedure (e.g., run length encoding, etc.) such that compressed discretionary data 194 is shorter than discretionary data 114 thereby leaving extra space in the discretionary portion of track data 112 for placement of additional data. Modified discretionary data 192 may be compressed using run-length-encoding (RLE), encoding of modified discretionary data 192 into an expanded character space, other compression systems or combinations of one or more compression systems. Compression of the modified discretionary data 192 may include data transformations such a Burrows-Wheeler transformation or other transformation of the modified discretionary data prior to compression. If desired, at step 184, an optional checksum adjustment digit (not shown) may be inserted into the track data.

At step 186, compressed discretionary data 194 may be encrypted. As shown in FIG. 8, compressed discretionary data 194 may be encrypted using an FPE algorithm that preserves the length and character space of compressed discretionary data 194. Encrypted discretionary data 196 has the same length (e.g., 15 characters) and character space (e.g., numbers 0-9 and capital letters A-Z) as compressed discretionary data 194. Due to compression of modified discretionary data 192 prior to encryption, encrypted discretionary data 196 is shorter in length than original discretionary data 114. Therefore space is available in the discretionary portion of the track for additional data such as key management data.

At step 188, additional data 132 may be added to the discretionary portion of the track. Additional data 132 may be key management data such as a DUKPT key or other key version data associated with an encryption key that was used to compress discretionary data 194 in step 186. In the example of FIG. 8, additional data 132 (e.g., the digits "1234") are pre-pended to the beginning of the discretionary portion of the track. This is merely illustrative. Additional data 132 may be appended to the end of the discretionary portion of the track, or may be inserted into any know location within encrypted discretionary data 196.

At step 190, integrity data such as integrity data 134 may be inserted into the discretionary portion of the track (e.g., appended, pre-pended or inserted into a known location). Integrity data 134 may, as shown in FIG. 8, be a single digit (e.g., the digit "5") or may be more than one digit. Integrity data 134 may include a Message Authentication Code (MAC), a set of known characters (e.g., a run of zeros or other fixed string), or other integrity data. TEP3 track data 136 including PAN removal data 128, key management data 132, integrity data 134, and encrypted discretionary data 196 may then be transmitted to payment gateway 28 through intermediate systems 26. If desired, integrity data 134 may be added to the discretionary portion of the track containing compressed discretionary data 194 prior to encryption. In this way, integrity data 134 may also be encrypted.

Figure 9:
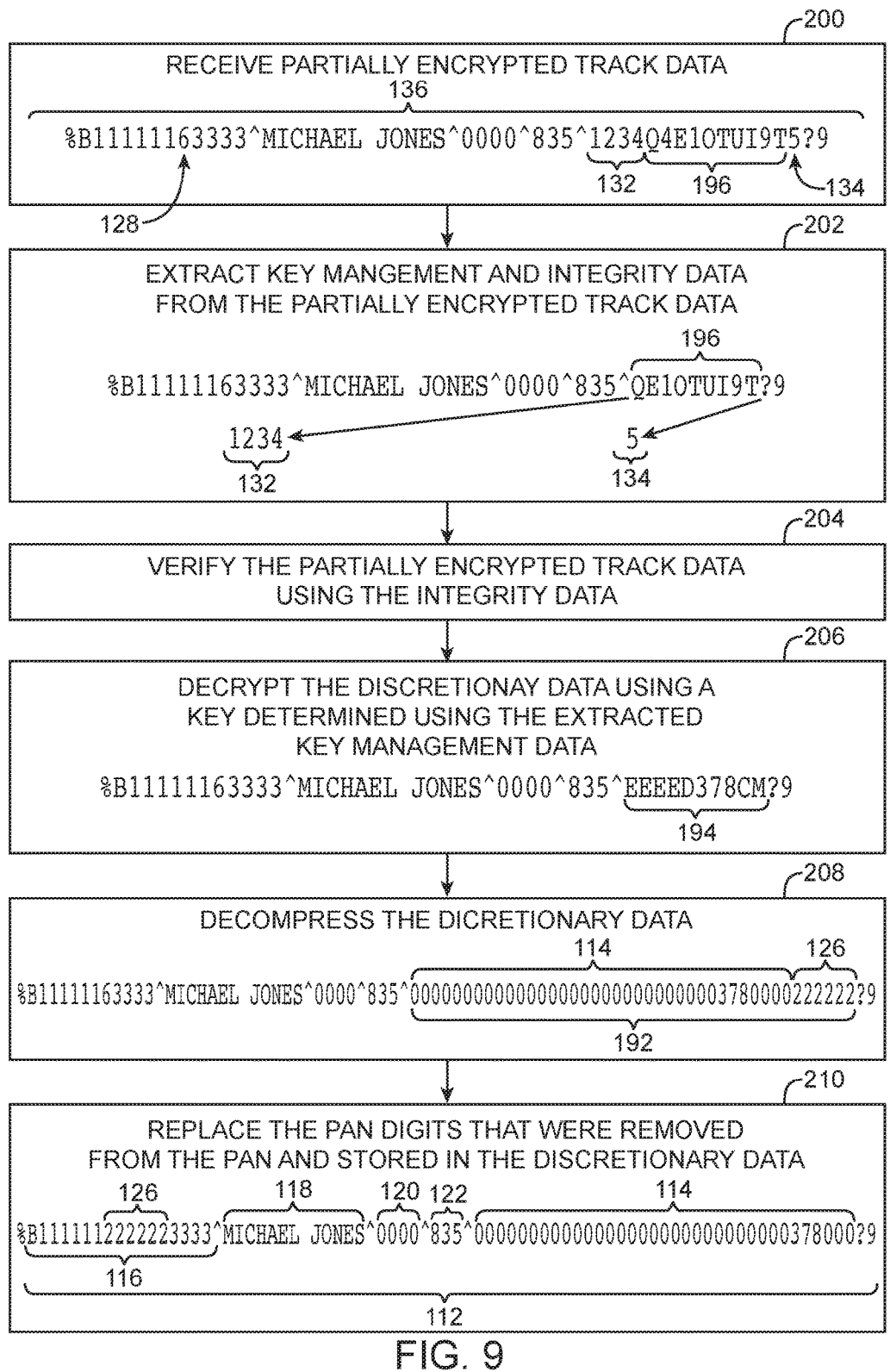
FIG. 9 is a flow chart of illustrative steps involved in decompressing and decrypting track data in accordance with an embodiment of the present invention.

Illustrative steps involved in using payment gateway 28 of FIG. 1 to process TEP3 track data generated using the steps shown in FIG. 8 are shown in FIG. 9.

At step 200, TEP3 track data 136 including PAN removal data 128, key management data 132, integrity data 134, encrypted discretionary data 196, and other track data may be received by payment gateway 28 (see FIG. 1).

At step 202, key management data 132 and integrity data 134 may be extracted from the discretionary portion of the track.

At step 204, integrity data 134 may be used to verify the TEP3 track data.

At step 206, key management data 132 may be used to determine a managed encryption key (e.g., a count-specific key of the type shown in FIG. 3). The managed encryption key may then be used to decrypt encrypted discretionary data 196 thereby recovering compressed discretionary data 194.

At step 208, compressed discretionary data 194 may be decompressed to recover modified discretionary data 192 containing discretionary data 114 and portion 126 of PAN 116.

At step 210, portion 126 of PAN 116 may be replaced in the appropriate location in the PAN portion of the track and PAN removal information 128 may be removed from the PAN portion of the track thereby recovering the original track data 112. Original track data 112 including PAN 116, customer name 118, expiration date data 120, service code data 122 and discretionary data 114 may then be used to process a payment request using payment gateway 28.

If desired, other types of track data may be compressed and encrypted (and decompressed and decrypted) in this way. For example, payment card expiration date data may be encrypted by placing this information in the discretionary field and compressing the discretionary field. If desired, a number of different parts of the track data may be compressed and added together to form a contiguous addition to the end of the discretionary track field. The use of a contiguous region at the end of the discretionary track field to hold compressed data from multiple portions of the track data may help reduce the complexity of track data processing operations.

Although sometimes described in the context of illustrative card track data such as magnetic card track data and payment card data, other types of card data may be secured using these techniques if desired. For example, card data from smart cards and wireless cards may be secured in addition to card data from magnetic stripe cards. Card data from magnetic cards, smart cards, and wireless cards other than payment cards may also be secured. The use of magnetic track data and payment card track data is merely illustrative.

The foregoing is merely illustrative of the principles of this invention and various modifications can be made by those skilled in the art without departing from the scope and spirit of the invention.

What is claimed is:

1. A method for processing payment card track data, the method comprising:
   using a card reader at point-of-sale computing equipment, obtaining the payment card track data from a payment card;
   at a processor on the point-of-sale computing equipment, compressing discretionary data in a discretionary field of the payment card track data by performing a compression operation on the discretionary data in the payment card track data so that the payment card track data shrinks from a first length to a second length that is shorter than the first length;
   at the processor, moving a fixed number of personal account number digits in the payment card track data to the discretionary field after the discretionary data has been compressed;
   at the processor, encrypting the discretionary field having the compressed discretionary data and the fixed number of personal account number digits using an encryption key having associated key version information;
   at the processor, inserting the key version information associated with the encryption key that was used in encryption of the discretionary field having the compressed discretionary data and the fixed number of personal account number digits of the payment card track data into a space in the discretionary field that was created by compressing the discretionary field of the payment card track data;
   at the point-of-sale computing equipment, transmitting the payment card track data having the inserted key version information and the encrypted discretionary field to payment card processor computing equipment that is separate from the point-of-sale computing equipment over a communications network;
   at the payment card processor computing equipment, extracting the key version information from the payment card track data having the inserted key version information and the encrypted discretionary field received from the point-of-sale computing equipment;
   at the payment card processor computing equipment, identifying a cryptographic key based on the extracted key version information;
   at the payment card processor computing equipment, decrypting the encrypted discretionary field of the payment card track data received from the point-of-sale computing equipment using the identified cryptographic key to generate a decrypted discretionary field having the fixed number of personal account number digits and the compressed discretionary data;
   at the payment card processor computing equipment, inserting the fixed number of personal account number digits from the decrypted discretionary field into a personal account number field of the received payment card track data;
   at the payment card processor computing equipment, decompressing the compressed discretionary data in the decrypted discretionary field to generate restored payment card track data; and
   at the payment card processor computing equipment, authorizing a purchase transaction using the payment card at the point-of-sale computing equipment based on the restored payment card track data.

2. The method defined in claim 1 wherein compressing the discretionary data comprises mapping the discretionary data from a first character space having a first number of characters to second character space having a second number of characters that is greater than the first number of characters.

3. The method defined in claim 1 further comprising:
   before encrypting the discretionary field having the compressed discretionary data and the fixed number of personal account number digits, inserting at least one check digit into the space that was created by compressing the discretionary data, wherein encrypting the discretionary field having the compressed discretionary data and the fixed number of personal account number digits comprises encrypting the compressed discretionary data, the fixed number of personal account number digits, and the at least one check digit.

4. The method defined in claim 1, wherein the point-of-sale computing equipment comprises an additional processor and wherein obtaining the payment card track data from the payment card comprises obtaining the payment card track data at the additional processor.

5. The method defined in claim 4, wherein the additional processor is embedded within a tamper-proof enclosure, the method further comprising:
   at the additional processor, encrypting the obtained payment card track data using a shared cryptographic key and transmitting the encrypted obtained payment card track data to the processor; and
   at the additional processor, decrypting the obtained payment card track data using the shared cryptographic key.

6. The method defined in claim 5, wherein the additional processor is embedded within a magnetic read head of the card reader.

7. The method defined in claim 1, wherein the fixed number of personal account number digits comprises an entirety of a personal account number in the obtained payment card track data.

8. The method defined in claim 1, further comprising:
at the processor, inserting information into a personal account number field of the obtained payment card track data that identifies the fixed number of personal account number digits that was moved to the discretionary field.

9. The method defined in claim 1 further comprising:
following encryption of the discretionary field having the compressed discretionary data and the fixed number of personal account number digits, inserting at least one check digit into the space that was created by compressing the discretionary data, wherein encrypting the discretionary field having the compressed discretionary data and the fixed number of personal account number digits comprises encrypting the compressed discretionary data and the fixed number of personal account number digits using the encryption key.

10. The method defined in claim 3, further comprising:
at the payment card processor computing equipment, extracting the at least one check digit from the space that was created by compressing the discretionary data in the received payment card track data.

11. The method defined in claim 10, further comprising:
at the payment card processor computing equipment, verifying the encrypted discretionary field using the extracted at least one check digit.

12. The method defined in claim 1 further comprising:
following encryption of the discretionary field having the compressed discretionary data and the fixed number of personal account number digits, inserting a Message Authentication Code that depends on at least a portion of the encrypted discretionary field into the space that was created by compressing the discretionary data.

13. The method defined in claim 1 wherein the primary account number has four trailing digits and six leading digits and wherein moving the fixed number of personal account number digits comprises moving all digits between the six leading digits and the four trailing digits from a personal account number field of the payment card track data to the discretionary field after the discretionary data has been compressed.

* * * * *